United States Patent [19]

Cohen

[11] Patent Number: 5,384,981
[45] Date of Patent: Jan. 31, 1995

[54] GLUE BOARD

[75] Inventor: Leon R. Cohen, Ephrata, Pa.

[73] Assignee: Woodstream Corporation, Lititz, Pa.

[21] Appl. No.: 77,457

[22] Filed: Jun. 17, 1993

[51] Int. Cl.⁶ ............................................. A01M 1/14
[52] U.S. Cl. ............................................. 43/114
[58] Field of Search ................. 43/114, 115, 121, 107

[56] References Cited

U.S. PATENT DOCUMENTS

| 125,326 | 4/1872 | Peck | 43/114 |
|---|---|---|---|
| 393,273 | 11/1888 | Thum . | |
| 447,121 | 2/1891 | Stecher | 43/114 |
| 469,021 | 2/1892 | Smith . | |
| 793,871 | 7/1905 | Bien . | |
| 862,467 | 8/1907 | Gardiner | 43/114 |
| 2,264,875 | 12/1941 | Greoling | 43/114 |
| 3,398,478 | 8/1968 | Pearsall | 43/58 |
| 3,913,259 | 10/1975 | Nishimura et al. | 43/114 |
| 4,385,465 | 5/1983 | Palmeri | 43/58 |
| 4,425,731 | 1/1984 | Orlando | 43/58 |
| 4,438,584 | 3/1984 | Baker | 43/114 |
| 5,031,354 | 7/1991 | Olson | 43/114 |
| 5,048,224 | 9/1991 | Frisch | 43/114 |
| 5,299,835 | 4/1994 | Sonnenberg | 253/56 |

FOREIGN PATENT DOCUMENTS 2058537  4/1981  United Kingdom ............... 43/114

Primary Examiner—P. Austin Bradley
Assistant Examiner—James Miner
Attorney, Agent, or Firm—Jacobson, Price, Holman & Stern

[57] ABSTRACT

Disposable glue traps for catching rodents such as rats or mice are formed by sheets of folded paper or cardboard each provided with a glue layer. Each folded sheet has a self-adherent tear-away border so that a trap forms its own packaging, thereby dispensing with the need for separate outer packaging materials.

12 Claims, 2 Drawing Sheets

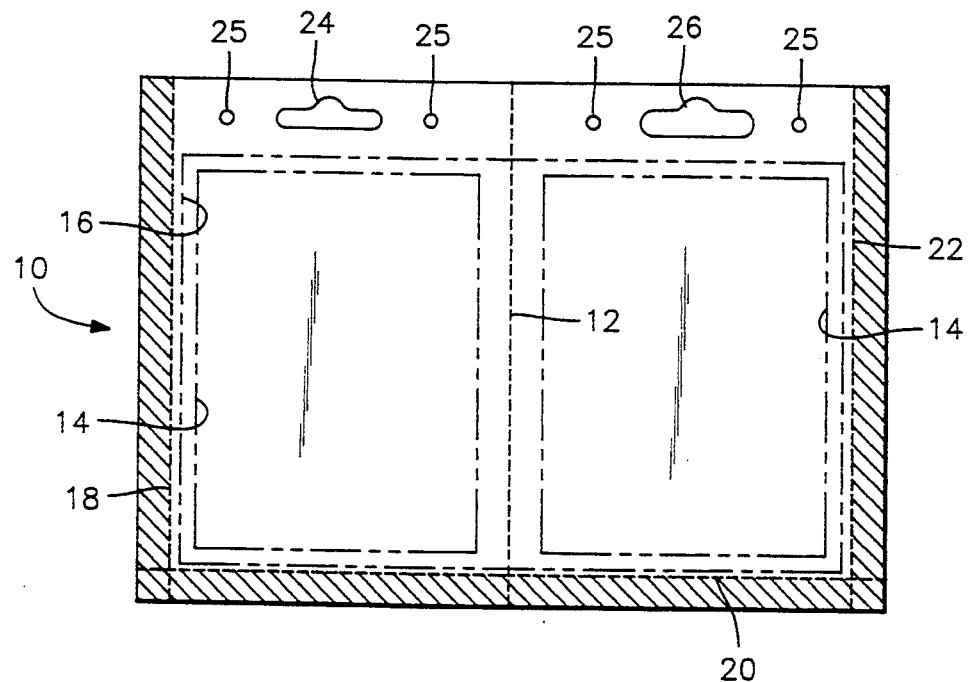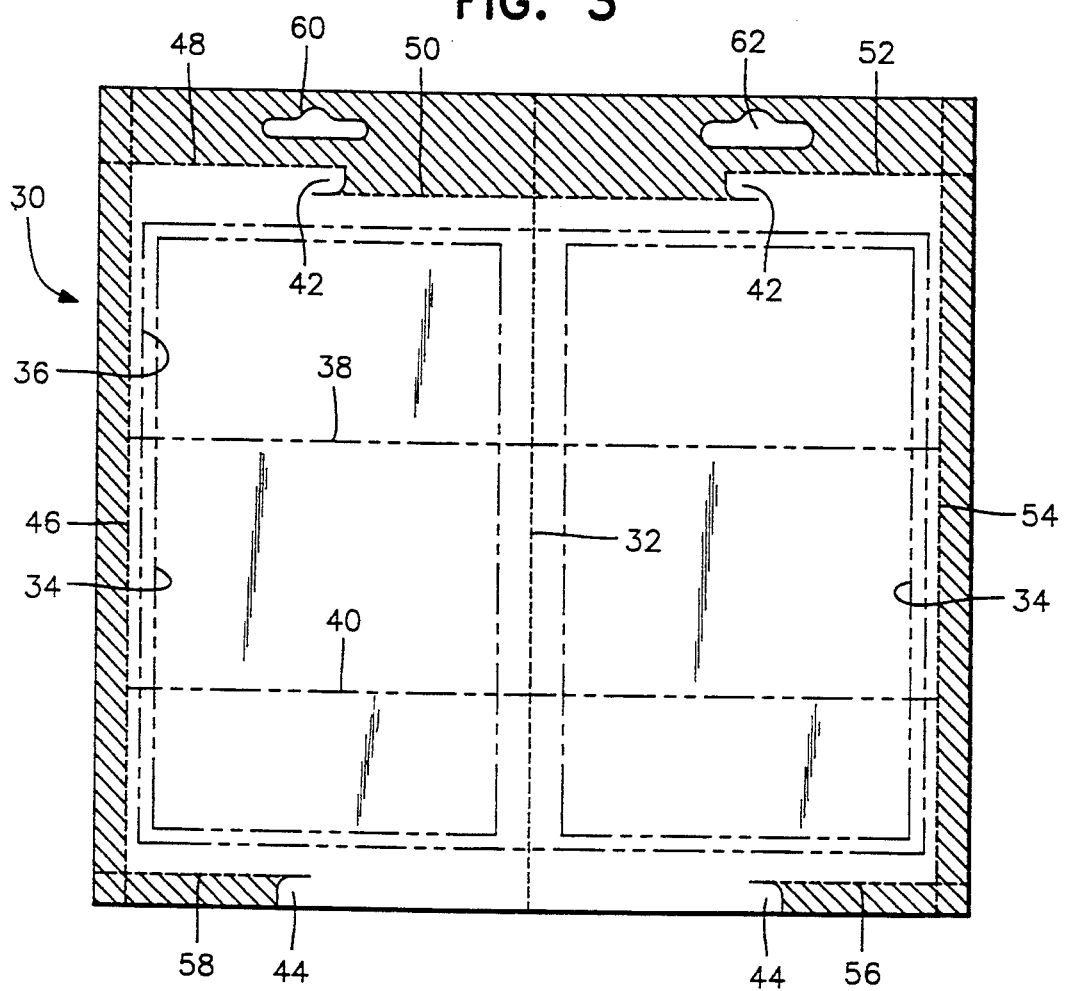

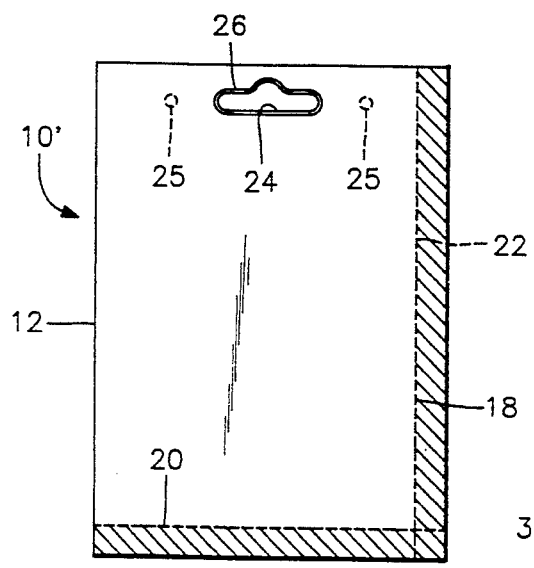
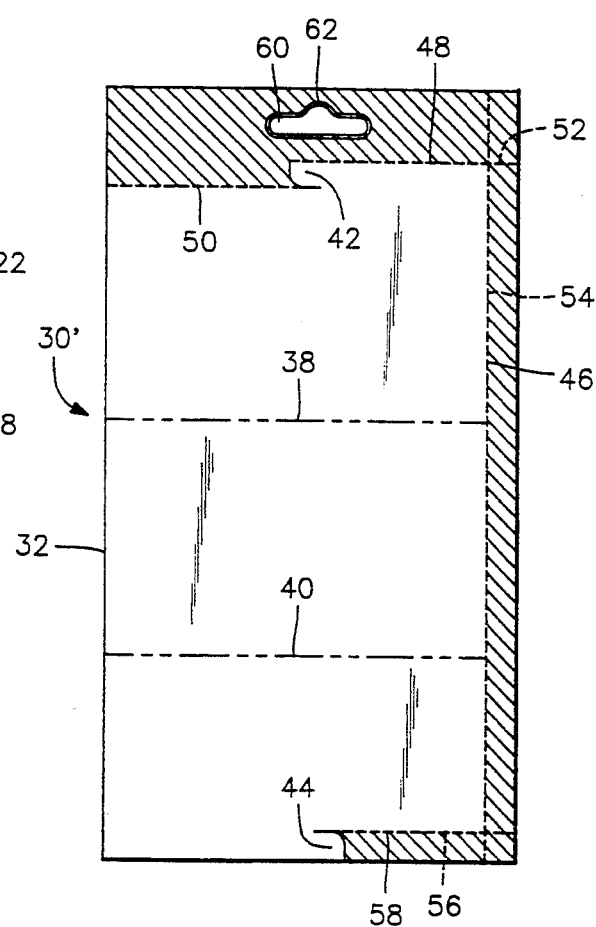
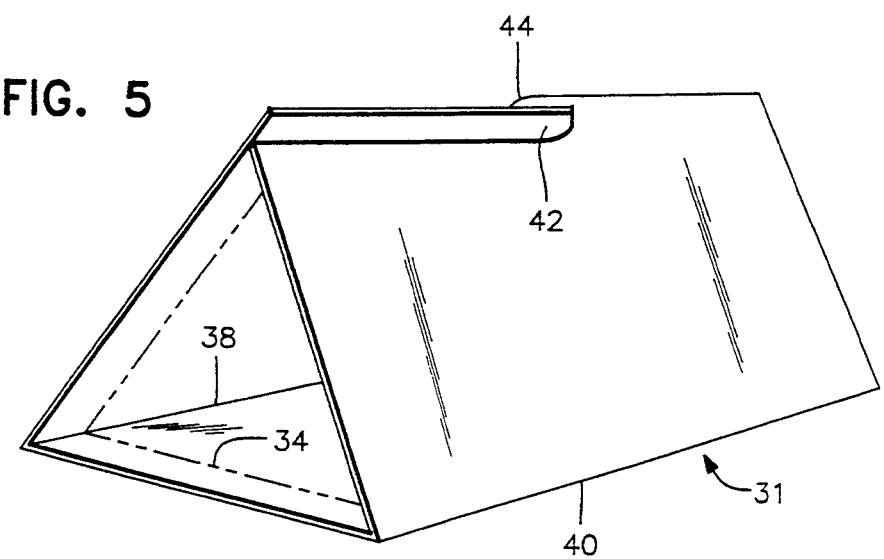

GLUE BOARD

BACKGROUND OF THE INVENTION

This invention relates to glue boards and glue traps for trapping vermin and rodents, such as mice and rats.

Glue traps are well known and consist generally of a layer of extremely sticky pressure sensitive adhesive on a suitable backing or support, such as a board or tray. In use, the trap is strategically located on a floor or other support surface in an infested area and in a manner whereby a rodent may be attracted onto or otherwise incidentally step onto the adhesive surface, thereby becoming entrapped by adhesion.

One known form of disposable glue trap comprises a board (e.g., stiff paper or cardboard) with an adhesive layer which, for shipping and sale of the trap, is covered by a release paper. Other traps may be folded up and packaged singly or in groups in an outer container, such as a cardboard sleeve or wrapper. In use, a consumer must remove a trap from the wrapper, uncover the adhesive and eventually dispose of both the trap and the wrapper.

SUMMARY OF THE INVENTION

It is an object of the invention to provide a disposable glue trap and package which is more economical in terms of materials and which is simpler to use than the known forms.

In accordance with the invention, a disposable glue-trap is made of sheet material such as stiff paper or cardboard in a manner whereby the trap forms its own outer packaging or wrapper and no additional packaging is required for shipping, displaying, and marketing the trap except to the extent that batches of traps may be shipped in boxes or other containers.

Thus, at least in a preferred form of the invention, a disposable glue trap package comprises a board with an inner surface defining a central area having at least one glue panel with a glue layer covered by release paper, a fold line about which the board is folded to form an envelope and a tear-away border at least partially surrounding the central area and which is formed by self-adhesive sections of the board adhered substantially permanently together. The outer surface of the package is conveniently provided with printed material, such as instructions, advertising and the like in a manner akin to the separate outer packaging of a conventional trap. The packages may be provided with apertures whereby they may be suspended, for sale, from a display hook or the like.

In use, a consumer removes the tear-away, generally perforated, self-adhered border of the package and unfolds the remaining central portion to expose the release paper-covered glue panel. The trap can then be used in the usual way and there is no outer wrapper to be disposed of.

Glue trap packages in accordance with the invention can have a central portion which defines a single trap or a plurality of separate tear-apart traps.

Additional features and advantages of the invention will become apparent from the ensuing description and claims read in conjunction with the attached drawings.

BRIEF DESCRIPTION OF DRAWINGS

FIG. 1 is a plan view of the inner surface of a fold-up blank for a glue-trap package according to the invention, FIG. 2 is a plan view of a package formed from the blank shown in FIG. 1, FIG. 3 is a view similar to FIG. 1 of a fold-up blank for another glue-trap package according to the invention, FIG. 4 is a view similar to FIG. 2 of a package formed from the blank shown in FIG. 3, and FIG. 5 is a perspective view of a glue trap formed from the package shown in FIG. 4.

DESCRIPTION OF PREFERRED EMBODIMENTS

FIG. 1 shows a rectangular blank 10 of stiff paper or cardboard of a kind well-known for use in conventional glue traps. The blank is divided into two halves by a central perforated fold line 12. On one surface (the inner surface) of each half of the blank there is a rectangular layer of very sticky glue, defined by lines 14. Glues suitable for use in traps of this nature are well-known the art and the selection of a particular glue is not a part of the instant invention and need not be described herein in detail. The glue layers are covered by a common sheet of release paper indicated by line 16. Surrounding the central area of the blank, which includes the glue layers and release paper, is a tear-away border portion, shown shaded, which is defined by perforated lines 18, 20 and 22. The inner surface of the blank is provided with adhesive, of any suitable kind known in the art, along the shaded border portion, so that when the blank is folded along line 12', the two halves of the blank will be permanently adhered together over the entire shaded area. In the non-shaded areas of the border portion of the blank there are formed suspension apertures 24, 26 of unequal size for suspending the completed package from a display hook or the like and glue dots 25 for holding the non-shaded areas together. Generally, the display printing will be placed on the side of the package having the small-size suspension aperture 24, so that if there is any misalignment of the apertures, this will not be evident to a consumer viewing the display side of the package.

The blank is folded along line 12 to form the package 10' shown in FIG. 2 and the shaded border areas become permanently adhered together while the non-shaded areas are adhered together by the glue dots. It is understood that the outer surface of the blank and package will be provided with printed matter (not shown) such as instructions for use, trade names, advertising and the like.

To form the package 10' into a glue trap, the permanently adhered border region of the package 10' is torn away along lines 18, 20 and the package is then unfolded, breaking apart the glue dots 25, to expose the release paper-covered glue areas. If desired, the trap can be divided into two glue boards by tearing along line 12.

The blank 30 shown in FIG. 3 is of similar materials to blank 10 and is designed to form two separate tent-like glue traps 31 as shown in FIG. 5. Again, the blank is divided into two halves by a perforated fold and tear line 32. Each half of the blank again has a rectangular glue layer on its inner surface, indicated in each case by a dotted line 34. The glue layers are covered by a common sheet of release paper indicated by line 36. In this embodiment, the blank also has transverse fold lines 38, 40 dividing each half of the blank into three foldable panels. Again, a border area of the blank, shown shaded, and defined by tear-away perforation lines 46–58 is provided with adhesive on the inner surface of the blank. Die-cut tabs 42 are formed between lines 48, 50 and 52, 50 and complimentary interfitting tabs 44 are formed at the opposite end of the blank. Suspension apertures 60, 62 of unequal size are again provided, in this case in the tear-away portion of the border region.

Blank 30 is folded along line 32 to form a glue trap package 30' as shown in FIG. 4 with opposite portions of the blank forming the shaded border area being permanently adhered together. Again, the outer surface of the blank may be printed with suitable display material.

To form the package into two traps 31, the glued border region is torn away along lines 46–58 and the package is unfolded and separated along line 32 after removal of the release paper covering the glue areas. Each half of the remaining blank will have a shape as shown in FIG. 3 with the shaded areas removed, and each half of the blank can then be formed into a trap 31 (FIG. 5) by folding along lines 38, 40 and by inter-engaging the tabs 42, 44.

While only preferred embodiments of the invention have been described herein in detail, the invention is not limited thereby and modifications can be made within the scope of the attached claims.

I claim:

1. A package for forming into a pair of glue traps to catch rodents and vermin comprising a sheet folded into two halves, each half having an inner surface, an outer surface, and a layer of rodent-catching adhesive on the inner surface the layers of adhesive facing each other and being separated by release paper, the package further comprising a tear-away border portion formed by opposite edge portions of the sheet around said layers of adhesive which edge portions are defined by perforations formed in the sheet and which are adhered together whereby the border portion must be torn away from the package in order to unfold the sheet and expose the release paper-covered layers of adhesive.

2. A package as claimed in claim 1, wherein the outer surface of the sheet is provided with printed material.

3. A package as defined in claim 1, wherein the package is rectangular and has one edge defined by a fold line in the sheet, and wherein the tear away border portion of the package includes a first perforated portion of the package extending along a second edge of the package opposite said one edge.

4. A package as defined in claim 3, wherein the tear away portion includes a second perforated portion extending along a third edge of the package.

5. A package as defined in claim 4, which includes a suspension aperture adjacent a fourth edge of the package.

6. A package as defined in claim 3, wherein said fold line comprises a perforation line for separating said halves of the sheet into a pair of glue traps.

7. A package as defined in claim 6, wherein the tear away portion includes second of perforated portion extending along a third edge of the package and which is defined by offset lines of said perforations interconnected by first tabs die-cut in the sheet, and a third perforated portion extending partway along a fourth edge of the package from said second edge, the third perforated portion being defined by lines of said perforations extending from the second edge to second tabs die-cut in the sheet complimentary to said first tabs whereby when the tear away portion is removed, the package can be separated along said fold line into two halves each formed with first and second tabs which can be inter-engaged to form a glue trap in the form of a tent.

8. A package as defined in claim 7, wherein the second perforated portion includes a suspension aperture.

9. A blank of sheet material for forming into a glue trap package, the blank having an inner surface and an outer surface, a central fold line dividing the blank into two like halves, a layer of rodent-catching adhesive on the inner surface of the blank on each of said halves, complimentary tear-away edge portions on each half of the blank defined by perforations in the blank formed around the respective layers and an adhesive on at least one of said edge portions to adhere the edge portions together when the blank is folded along said fold line and form a glue trap package with an edge portion which must be torn away in order to unfold the package, including release paper covering both layers.

10. A blank as defined in claim 9, wherein the fold line is a perforated line for separating the respective halves of the blank to form separate glue traps.

11. A blank as defined in claim 10, wherein each half of the blank is formed with transverse fold lines and complimentary inter-engageable edge tabs for folding the respective half into a tent-shaped glue trap.

12. A blank as defined in claim 9, further including aligned different size suspension apertures in the respective halves of the blank and display printing on the outer surface of the blank on the half which includes a smaller of said apertures.

* * * * *